United States Patent Office.

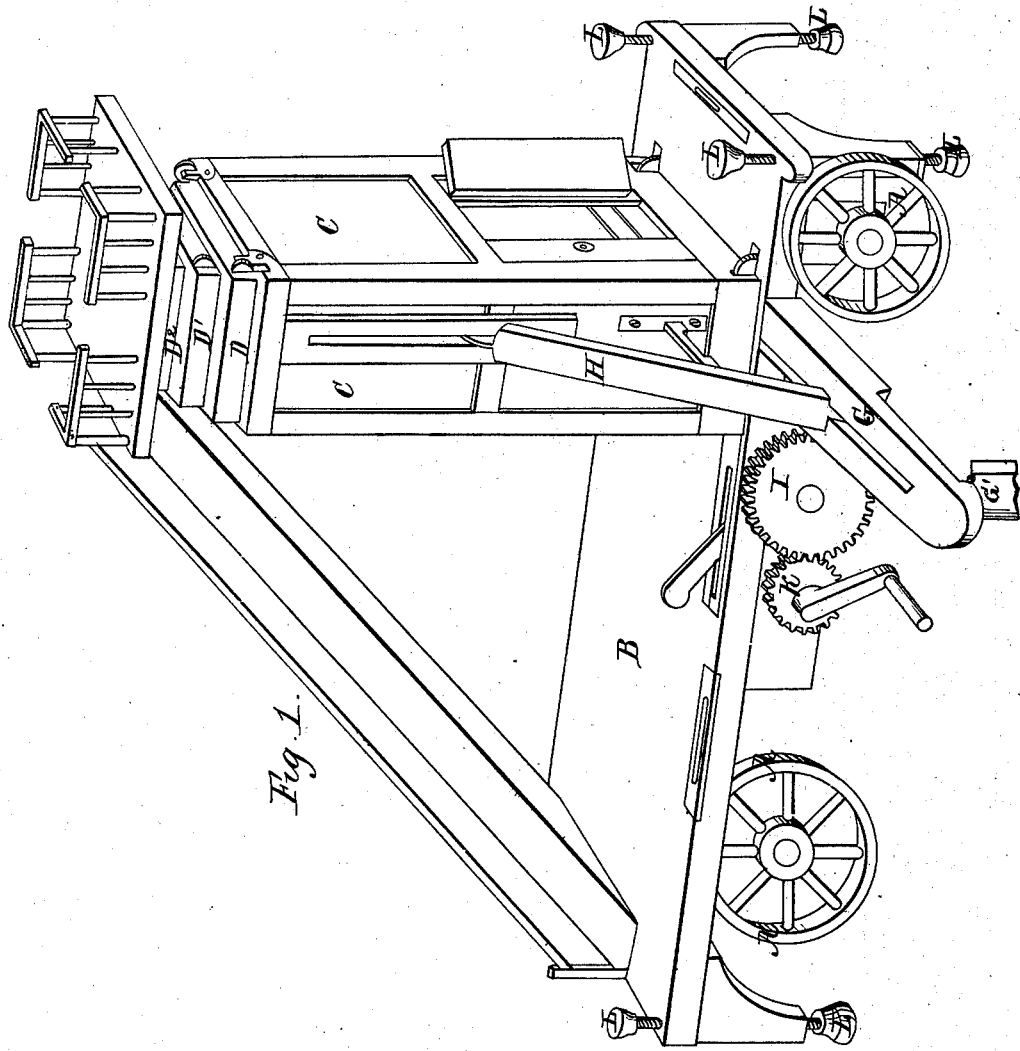

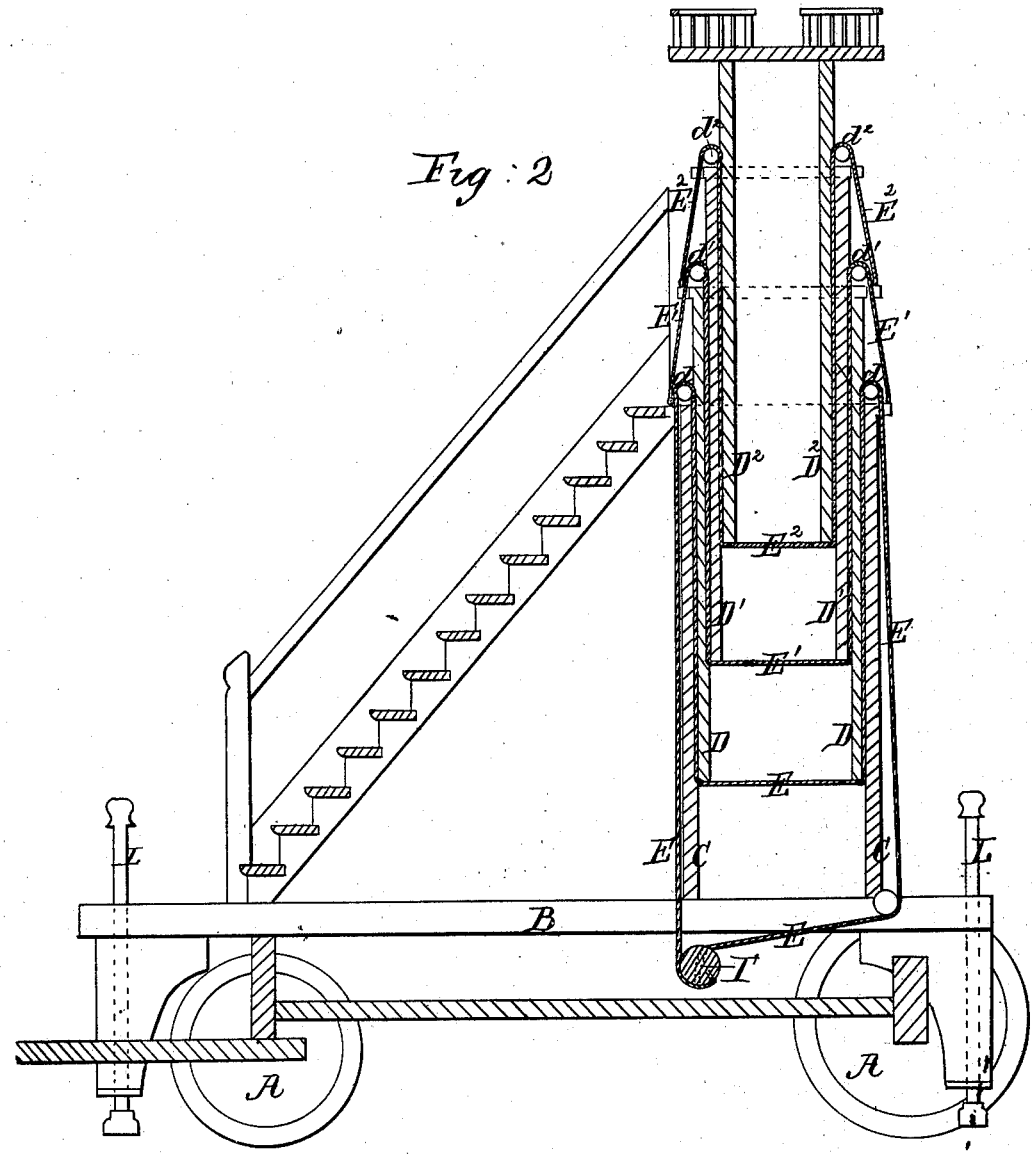

VOLNEY O'BRYAN, OF ST. JOHNS, MICHIGAN, ASSIGNOR TO DE WITT C. O'BRYAN AND AMELIA O'BRYAN.

Letters Patent No. 78,122, dated May 19, 1868.

IMPROVED FIREMAN'S ELEVATOR.

*The Schedule referred to in these Letters Patent and making part of the same.*

TO ALL WHOM IT MAY CONCERN:

Be it known that I, VOLNEY O'BRYAN, of St. Johns, in the county of Clinton, and State of Michigan, have invented a new and useful Improvement in Firemen's Elevators; and I do hereby declare that the following is a full, clear, and exact description of the same, reference being had to the annexed drawings, making part of this specification, in which—

Figure 1 is a perspective view, and
Figure 2 is a vertical elevation.

The same letters are employed in both figures in the designation of the same parts.

My invention relates to a machine for elevating firemen, to bring them in position to operate effectually in the extinguishment of fires, and to facilitate the escape of persons from burning buildings; and it consists in the arrangement of the sectional frames, and the ropes for hoisting the same.

The machine is carried upon wheels, A. B. is the frame or body of the wagon. C, a vertical frame, attached firmly to the wagon. Within this is a vertically-sliding frame, which is suspended upon two continuous cords, E, one on each side. Both ends of the cord are fastened to the axle I'. The cords are carried over sheaves $d\ d$, on top of the frame C. As the axle revolves, both ends of the cords being wound about it, the frame will be raised.

Another frame, $D^1$, sliding vertically, is in like manner placed within the frame D, also suspended upon continuous cords $E^1$, the ends of which are fastened to the top of the frame C, on each side, and carried thence over sheaves $d^1$, on top of the frame D, and thence down and under the bottom of the frame. As the frame D is raised, the ends of the cords E being fixed, as the frame D is forced upwards against the cord, the frame $D^1$ will be simultaneously raised.

In the like manner another frame, $D^2$, is suspended upon cords attached, on each side, to the top of the frame D, and carried thence over a sheave, $d^2$, on top of the frame $D^1$, and thence down under the frame $D^2$, so that, as the frame $D^1$, in rising, presses against the cord $E^2$, the frame $D^2$ will be equally raised; and in like manner with as many other frames as may be desired. On the top one is a platform, on which the fireman stands as the frames are raised. He may reach the platform by means of the stairs, F, which act also as a brace in front. The axle I' is turned by means of a spur-wheel, I, on the end thereof, driven by a crank on the pinion K.

The frame is laterally supported by a beam, G, to which is hinged a leg, G'. This beam turning upon a leg, is held by a hook, projecting from the side, when not in use. When it is to be used, it is turned down, and a prop-beam, H, the foot of which moves in a slot in the beam G, is secured so that its head shall rest against a ratchet in the base of the guide-groove, in which the head is fastened, thereby affording lateral support to the frame.

The wagon is held in a horizontal position by screws L, placed in the four corners, which may be turned down to sustain the wagon firmly in place, when the machine is to be brought into use.

What I claim as my invention, and desire to secure by Letters Patent, is—

The arrangement, in a machine for the purpose set forth, of the wagon B, stationary frame C, movable frames, ropes, and sheaves, and lateral supports G H, and screws L, substantially as described.

In testimony whereof, I have signed my name to this specification in the presence of two subscribing witnesses.

VOLNEY O'BRYAN.

Witnesses:
JOHN S. HOLLINGSHEAD,
L. MURPHY.